(12) United States Patent
Yeh et al.

(10) Patent No.: US 9,998,350 B2
(45) Date of Patent: Jun. 12, 2018

(54) TESTING DEVICE AND TESTING METHOD (71) Applicant: Powertech Technology Inc., Hsinchu County (TW)

(72) Inventors: Chih-Hui Yeh, Hsinchu County (TW); Chih-Wei Lee, Hsinchu County (TW)

(73) Assignee: Powertech Technology Inc., Hsinchu County (TW)

( * ) Notice: Subject to any disclaimer, the term of this patent is extended or adjusted under 35 U.S.C. 154(b) by 57 days.

(21) Appl. No.: 15/298,246

(22) Filed: Oct. 20, 2016

(65) Prior Publication Data
US 2017/0118106 A1 Apr. 27, 2017

(30) Foreign Application Priority Data

Oct. 22, 2015 (TW) .............................. 104134638 A (51) Int. Cl.
H04L 12/26 (2006.01)
H04B 7/04 (2017.01)
H04B 7/0413 (2017.01)

(52) U.S. Cl.
CPC ........... H04L 43/50 (2013.01); H04B 7/0413 (2013.01)

(58) Field of Classification Search
CPC .............................. H04B 7/0413; H04L 43/50
See application file for complete search history.

(56) References Cited

U.S. PATENT DOCUMENTS

| | | | | |
|---|---|---|---|---|
| 3,909,799 A | * | 9/1975 | Recks | G06F 9/262 710/5 |
| 4,575,792 A | * | 3/1986 | Keeley | G11C 29/48 711/126 |
| 6,353,908 B1 | * | 3/2002 | Heinrich | H04L 1/14 370/224 |
| 6,654,834 B1 | * | 11/2003 | Robertson | G06F 15/173 709/216 |
| 6,801,985 B1 | * | 10/2004 | Comisky | G06F 15/17 709/216 |
| 7,080,300 B1 | * | 7/2006 | Herron | G01R 31/31717 714/726 |
| 7,395,454 B1 | * | 7/2008 | Wohlgemuth | G06F 11/273 714/30 |
| 7,689,897 B2 | | 3/2010 | Priel et al. | |

\* cited by examiner

Primary Examiner — Kashif Siddiqui
(74) Attorney, Agent, or Firm — JCIPRNET (57) ABSTRACT

A testing device of high-frequency memory comprises a transfer interface, a tester and a socket group. The tester is electrically connected to the socket group via the transfer interface. The transfer interface is configured to merge a first testing signal with a second testing signal to generate a double frequency testing signal, wherein the first testing signal and the second testing signal are outputted by the tester, and through the transfer interface, the double frequency testing signal is shared and transmitted to the socket group for testing at least two memory packages disposed on the socket group.

20 Claims, 7 Drawing Sheets

TESTING DEVICE AND TESTING METHOD

CROSS-REFERENCE TO RELATED APPLICATION

This application claims the priority benefit of Taiwan application serial no. 104134638, filed on Oct. 22, 2015. The entirety of the above-mentioned patent application is hereby incorporated by reference herein and made a part of this specification.

BACKGROUND OF THE INVENTION

Field of the Invention

The present invention generally relates to a testing device and a testing method. More particularly, the present invention relates to a testing device and a testing method for memory packages.

Description of Related Art

After IC fabrication, wafer acceptance test (WAT), chip probing (CP), and package assembly, an appropriate tester should be adopted to perform final tests (FT) on the electrical functions of memory devices. Generally speaking, the highest testing frequency provided by a tester is fixed. However, the operation frequency of memory devices continuously increases, which makes existing testers not be able to test high-frequency memory devices in the next generation. A conventional method of frequency multiplication is proposed by changing a circuit board interface, or so-called Device Specific Adapter (DSA). As such, two input/output (I/O) terminals of a tester are connected to one pin of the circuit board interface to achieve frequency multiplication purpose. However, the testing efficiency and throughput may be greatly reduced. Moreover, testing accuracy is greatly reduced and potential errors are found when a single high-frequency testing signal is compared to a testing signal that has gone through frequency multiplication.

Figure 1:
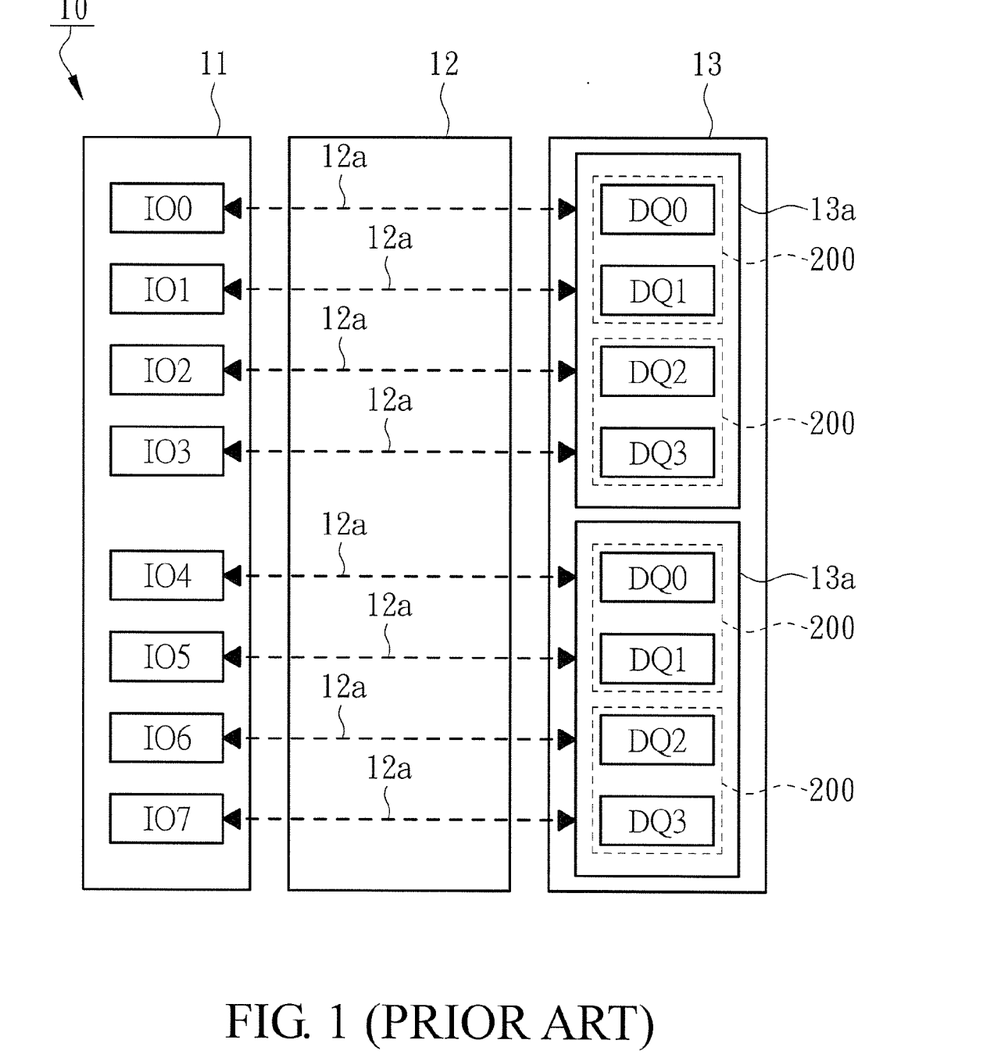
FIG. 1 is a block diagram of a conventional testing device for memory packages.

Referring to FIG. 1, a conventional memory testing device 10 includes a test head 11, a circuit board interface 12 and a socket group 13. The test head 11 includes a plurality of I/O terminals from IO0 to IO7 to output a plurality of testing signals respectively. The circuit board interface 12 is disposed between the test head 11 and the socket group 13. The circuit board interface 12 includes a plurality of buses 12a connecting the I/O terminals IO0 to IO7 to the corresponding pins of the socket group 13. The socket group 13 includes a plurality of sockets 13a to accommodate and to test a plurality of memory packages to be tested respectively. Each memory package includes one or multiple chips 200 assembled therein. The testing signals outputted from the I/O terminals IO0 to IO7 of the test head 11 are transmitted to the chips 200 of the memory package in the sockets 13a through the buses 12a. After receiving the testing signals, the chips 200 of the memory packages may transmit a plurality of feedback signals back to the test head 11. As such, the test head 11 may correlate the testing signals with the feedback signals to determine whether the chips 200 of the memory packages function normally or not.

Figure 2:
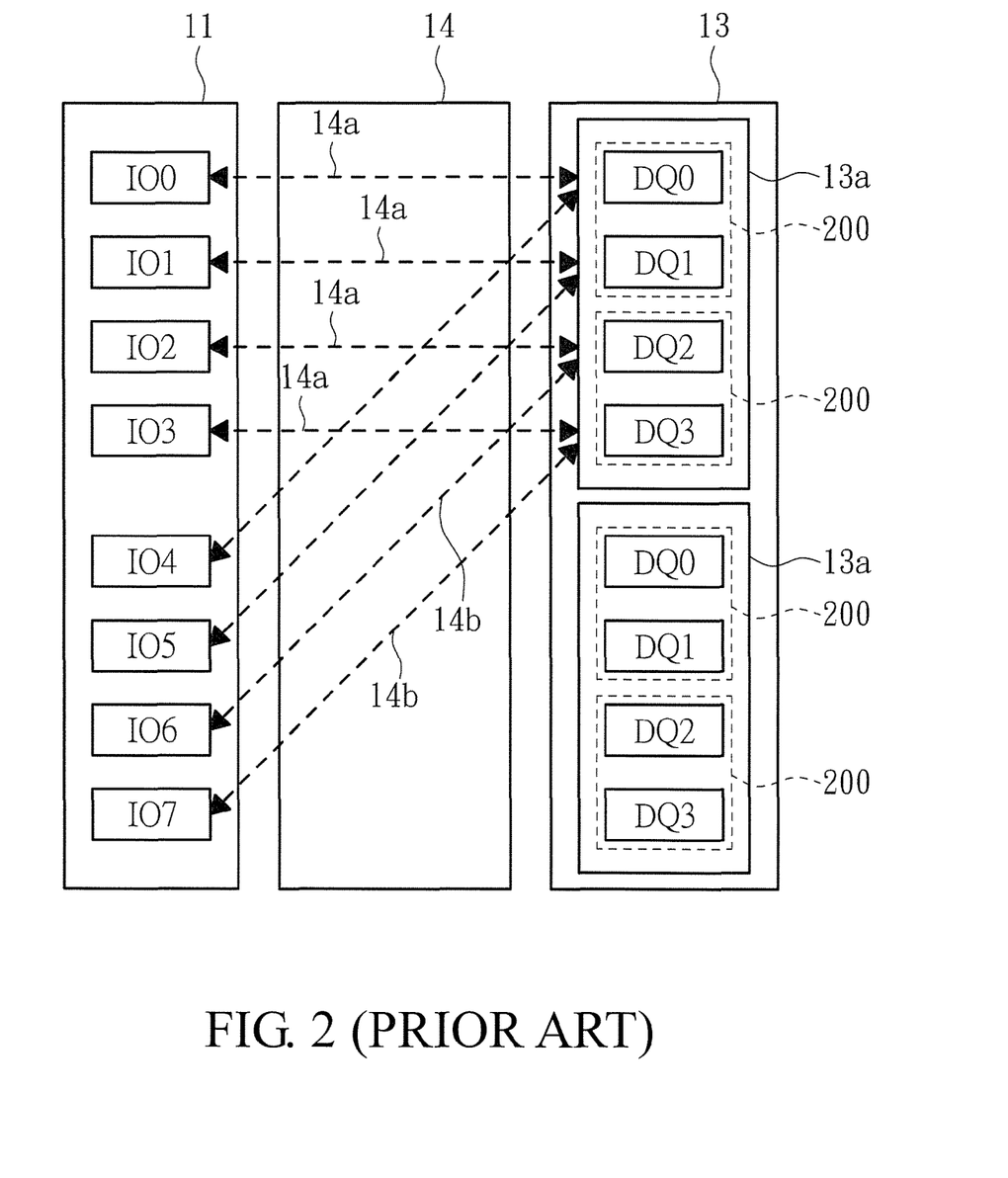
FIG. 2 is a block diagram of a conventional testing device configured to test high-frequency memory packages.

Referring to FIG. 1 again, in the testing device 10, the frequency of the testing signals provided by the test head 11 needs to match with the operation frequency of the chips 200 of the memory packages. For example, the test head 11 with 800 Mbps read/write capability can only test the 800 Mbps chips 200 of the memory packages. Therefore, referring to FIG. 2, in the conventional testing technology, when a test head 11 with 800 Mbps read/write capability is adopted to test a 1600 Mbps chip 200 of the memory package, the original circuit board interface 12 has to be replaced by another circuit board interface 14. The circuit board interface 14 includes a plurality of first buses 14a and a plurality of second buses 14b. Therein, one of first buses 14a and the corresponding second bus 14b in pairs are connected to the corresponding pins of the half of the sockets 13a of the socket group 13 to achieve frequency multiplication effect. However, the other half of the sockets 13a are idle contacts. Therefore, the chip 200 of the memory package can be tested through transmitting two testing signals from two corresponding I/O terminals IO0 to IO3 and IO4 to IO7 to one corresponding pin of the socket group 13. The testing method is able to test memory packages with higher frequency by the test head 11 with lower frequency. Nevertheless, the number of the memory packages which can be tested by the test head 11 is reduced to half, which leads to lower tester utilization and lower testing throughput. Moreover, referring to FIG. 2 again, in the conventional testing technology, when two testing signals with a timing difference transmit from two corresponding I/O terminals IOU to IO3 and IO4 to IO7 are connected to a corresponding one of the pins DQ0 to DQ3, the connecting lengths of the first buses 14a and the second buses 14b are different, which causes timing errors. As such, the pins DQ0 to DQ3 of the socket group 13 may not accurately receive two testing signals and merge into one double-frequency testing signal, and the time delay between the two testing signals would lead to input/output errors of the double-frequency testing signal.

SUMMARY OF THE INVENTION

Accordingly, the present invention is directed to a testing device and a testing method for high-frequency memory packages, wherein the signal processing module of the transfer interface is configured to merge two testing signals into one double-frequency testing signal, and the double-frequency testing signal is shared to the same pin of different sockets or to different pins of the same socket of the socket group, such that a tester with lower frequency not only is able to test the chips of the memory packages with higher frequency but also maintains the testing number of the memory packages using the valid sockets installed on the socket group.

The present invention provides a testing device for high-frequency memory packages including a transfer interface, a tester and a socket group. The transfer interface includes a signal processing module, a first bus, a second bus, a third bus and a fourth bus. Herein, the first bus, the second bus, the third bus and the fourth bus are connected to the signal processing module. The tester includes a first I/O terminal group and a second I/O terminal group, wherein the first I/O terminal group is coupled to the signal processing module through the first bus and the second I/O terminal group is coupled to the signal module through the second bus. The socket group includes a first pin group and a second pin group, wherein the first pin group is coupled to the signal processing module through the third bus and the second pin group is coupled to the signal processing module through the fourth bus. Herein, the first I/O terminal group is configured to transmit a first testing signal to the signal processing module, and the second I/O terminal group is configured to transmit a second testing signal to the signal processing module. The transfer interface is configured to merge the first testing signal and the second testing signal into a double-frequency testing signal, wherein the double-frequency testing signal is then transmitted to the first pin group through the signal processing module and the third bus, and the double-frequency testing signal is also transmitted to the second pin group through the signal processing module and the fourth bus.

The present invention provides a testing method for high-frequency memory packages, and the testing method includes the following steps.

The testing device described above is provided, wherein the testing device includes the transfer interface, the tester and the socket group; at least two memory packages to be tested are disposed on the socket group, wherein a first chip of the memory packages is electrically connected to the first pin group, and a second chip of the memory packages is electrically connected to the second pin group; and a WRITE procedure is performed, wherein the first testing signal is transmitted from the first I/O terminal group of the tester to the signal processing module, the second testing signal is transmitted from the second I/O terminal group to the signal processing module, then the transfer interface merges the first testing signal and the second testing signal to generate a double-frequency testing signal. The double-frequency testing signal is transmitted to the first chip through the signal processing module, the third bus and the first pin group, and the double-frequency testing signal is also transmitted simultaneously to the second chip through the signal processing module, the fourth bus and the second pin group, so as to reduce the time of the WRITE procedure. Moreover, the testing number of the memory packages disposed on the socket group does not need to be reduced and sacrificed.

The testing method of the present invention may further include a READ procedure, wherein a first feedback signal from the first chip is transmitted through the first pin group and the third bus to the signal processing module. The transfer interface duplicates the first feedback signal, which is then transmitted to the first I/O terminal group through the signal processing module and the first bus, and also simultaneously transmitted to the second I/O terminal group through the signal processing module and the second bus. A second feedback signal from the second chip is transmitted through the second pin group and the fourth bus to the signal processing module. The transfer interface duplicates the second feedback signal, which is then transmitted to the first I/O terminal group through the signal processing module and the first bus, and also simultaneously transmitted to the second I/O terminal group through the signal processing module and the second bus, such that the tester receives a plurality of identical feedback signals from different I/O terminal groups.

Based on the above-mentioned description, through merging of the testing signals and the duplication of the feedback signals by the signal processing module of the transfer interface, the tester is able to perform parallel testing to a plurality of memory packages simultaneously and to enable a low-frequency tester to test high-frequency memory packages. Moreover, the valid testing number and the testing efficiency of the memory packages are maintained.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

With reference to the attached drawings, the present invention is described by means of the embodiment(s) below. Therein, the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios may be selectively designed and disposed and the detail component layouts may be more complicated.

Figure 3:
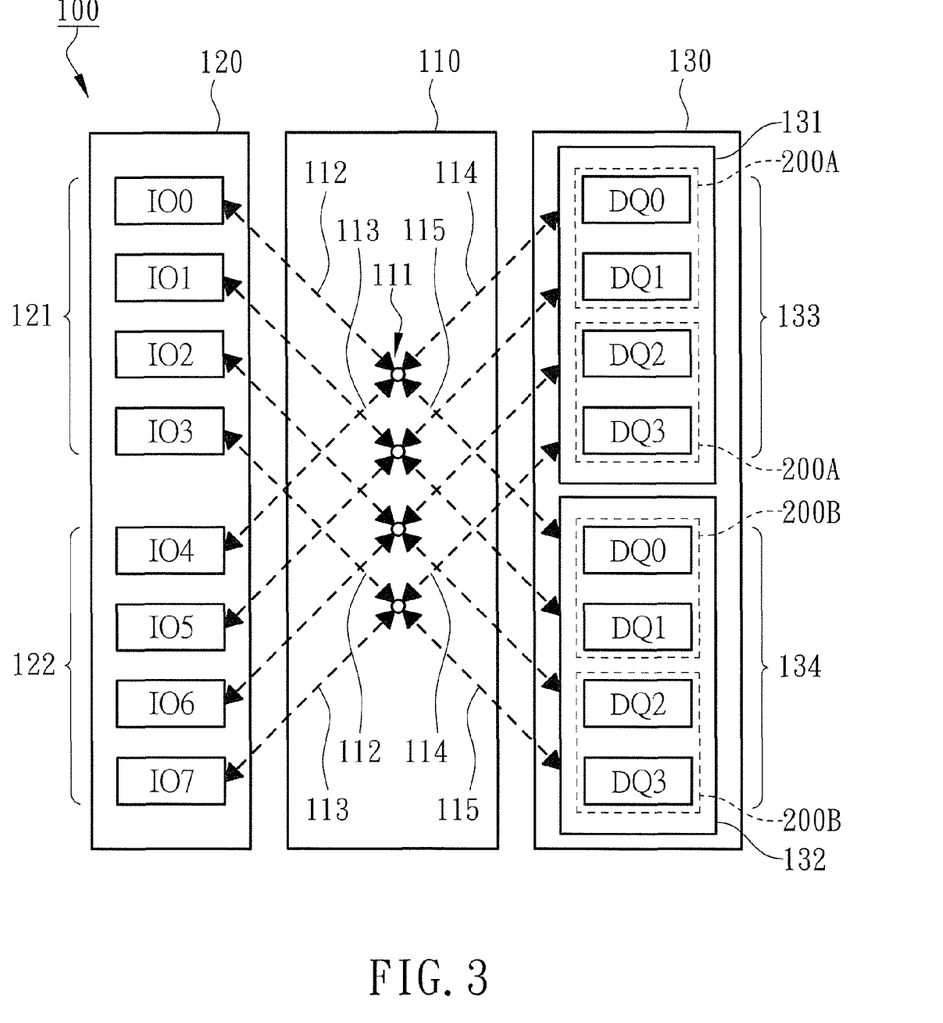
FIG. 3 is a block diagram of a testing device for high-frequency memory packages according to an embodiment of the present invention.

A testing device 100 for high-frequency memory packages according to an embodiment of the present invention is illustrated in a block diagram in FIG. 3. The testing device 100 includes a transfer interface 110, a tester 120 and a socket group 130, wherein the transfer interface 110 may include a Hi-Fix board and is connected between the tester 120 and the socket group 130.

The tester 120 includes a first I/O terminal group 121 and a second I/O terminal group 122. A general representation of the present embodiment is presented as follows. The first I/O terminal group 121 may include four I/O terminals IO0 to IO3 and the second I/O terminal group 122 may include four I/O terminals IO4 to IO7. A plurality of first testing signals are respectively transmitted from the I/O terminals IO0 to IO3 of the first I/O terminal group 121 and a plurality of second testing signals are respectively transmitted from the I/O terminals IO4 to IO7 of the second I/O terminal group 122, wherein the first testing signals and the second testing signals have the same frequency but have timing differences when transmitted by the tester 120.

The transfer interface 110 includes a signal processing module 111, a first bus 112, a second bus 113, a third bus 114 and a fourth bus 115. Each of the I/O terminals IO0 to IO3 of the first I/O terminal group 121 is coupled to a corresponding signal processing module 111 through the first bus 112. The first testing signals transmitted from the first I/O terminal group 121 may be transmitted to the signal processing module 111 through the first bus 112. Each of the I/O terminals IO4 to IO7 of the second I/O terminal group 122 is coupled to a corresponding signal processing module 111 through the second bus 113. The second testing signals transmitted from the second I/O terminal group 122 may be transmitted to the signal processing module 111 through the second bus 113. After the transfer interface 110 receives the first testing signals and the second testing signals, the signal processing modules 111 merge the first testing signals and the second testing signals to generate a plurality of double-frequency testing signals. Each of the double-frequency testing signals may be twice the frequency of each first testing signal or twice the frequency of each second testing signal.

A transmission path of the first bus 112 and a transmission path of the second bus 113 are substantially the same as shown in FIG. 3, such that the signal processing module 111 is able to receive the first testing signals and the second testing signals without any timing delay and avoid merging errors due to transmitting timing delay.

The socket group 130 may further include a first socket 131 and a second socket 132 as shown in FIG. 3. The first socket 131 and the second socket 132 are configured to accommodate a plurality of memory packages to be tested. Each of the sockets may be configured to accommodate one of the memory packages, and each of the memory packages includes one or more chips (a first chip 200A and/or a second chip 200B) assembled therein. The first chip 200A and the second chip 200B are disposed at different sockets during testing, i.e. the first chip 200A and the second chip 200B would not be simultaneously assembled in one designated memory package during testing procedure. The first socket 131 has a first pin group 133, and the second socket 132 has a second pin group 134, i.e. the first pin group 133 and the second pin group 134 are arranged at different sockets of the socket group 130. The first socket 131 and the second socket 132 have the same pin function arrangement to be signally connected to the corresponding third bus 114 and the fourth bus 115. The first socket 131 and the second socket 132 are sequentially connected to different buses with the same pin function arrangement, so as to be correspondingly connected to the third bus 114 and the fourth bus 115. The distinction between the pin groups 133, 134 depends on the sockets. When two pins are located at different sockets, these two pins are not classified into the same pin group. In the present embodiment, the first pin group 133 includes four pins DQ0 to DQ3 and the second pin group 134 also includes four pins DQ0 to DQ3, which means that each of the first pin group 133 and the second pin group 134 includes the pins DQ0 to DQ3 with the same pin function. The pins DQ0 to DQ3 of the first pin group 133 of the first socket 131 are coupled to the signal processing module 111 through the third bus 114, such that the double-frequency testing signals are transmitted to the first pin group 133 of the first socket 131 through the signal processing modules 111 and the third bus 114. The pins DQ0 to DQ3 of the second pin group 134 of the second socket 132 are coupled to the signal processing module 111 through the fourth bus 115, such that the double-frequency testing signals are transmitted to the second pin group 134 of the second socket 132 through the signal processing module 111 and the fourth bus 115. The said "different sockets with the same pin function arrangement are sequentially connected to the corresponding buses" is illustrated by the pins DQ0 to DQ3 of the first socket 131 sequentially coupled to the I/O terminals IO0 to IO3 of the first I/O terminals group 121 through the third bus 114 also being sequentially coupled to the IO4 to IO7 of the second I/O terminal group 122. The pins DQ0 to DQ3 of the second socket 132 sequentially coupled to the I/O terminals IO0 to IO3 of the first I/O terminal group 121 may also be sequentially coupled to the I/O terminals IO4 to IO7 of the second I/O terminal group 122.

The double-frequency testing signals are further transmitted to a plurality of chips (a first chip 200A and a second chip 200B) assembled in the memory packages through the first pin group 133 of the first socket 131 and the second pin group 134 of the second socket 132 to perform a testing procedure. The chips of the memory packages may output a plurality of feedback signals. Herein, a first chip 200A of a memory package disposed in the first socket 131 transmits a plurality of first feedback signals to the signal processing module 111 through the first pin group 133. The second chip 200B of another memory package disposed in the second socket 132 transmits a plurality of second feedback signals to the signal processing module 111 through the second pin group 134. The transfer interface 110 duplicates either the first feedback signals or the second feedback signals to generate a plurality of identical feedback signals. A part of the identical feedback signals is transmitted from the signal processing modules 111 to the first I/O terminal group 121 through the first bus 112 and another part of the identical feedback signals is transmitted from the signal processing modules 111 to the second I/O terminal group 122 through the second bus 113. The tester 120 receives the identical feedback signals from the memory packages disposed in the sockets at different I/O terminal groups 121 and 122 and correlate the first testing signals with the second testing signals to complete the testing of the memory packages.

As shown in FIG. 3, a transmission path of the third bus 114 and a transmission path of the fourth bus 115 are substantially the same, such that the signal processing module 111 may be able to transmit the first testing signals and the second testing signals without any timing delay. Since the transmission paths of the first bus 112 and the second bus 113 are substantially the same, the I/O terminals IO0 to IO3 of the first I/O terminal group 121 and the I/O terminals IO4 to IO7 of the second I/O terminal group 122 can simultaneously receive the identical feedback signals transmitted by the signal processing module 111 to avoid the effect of the timing delay on the testing results.

Figure 4A:
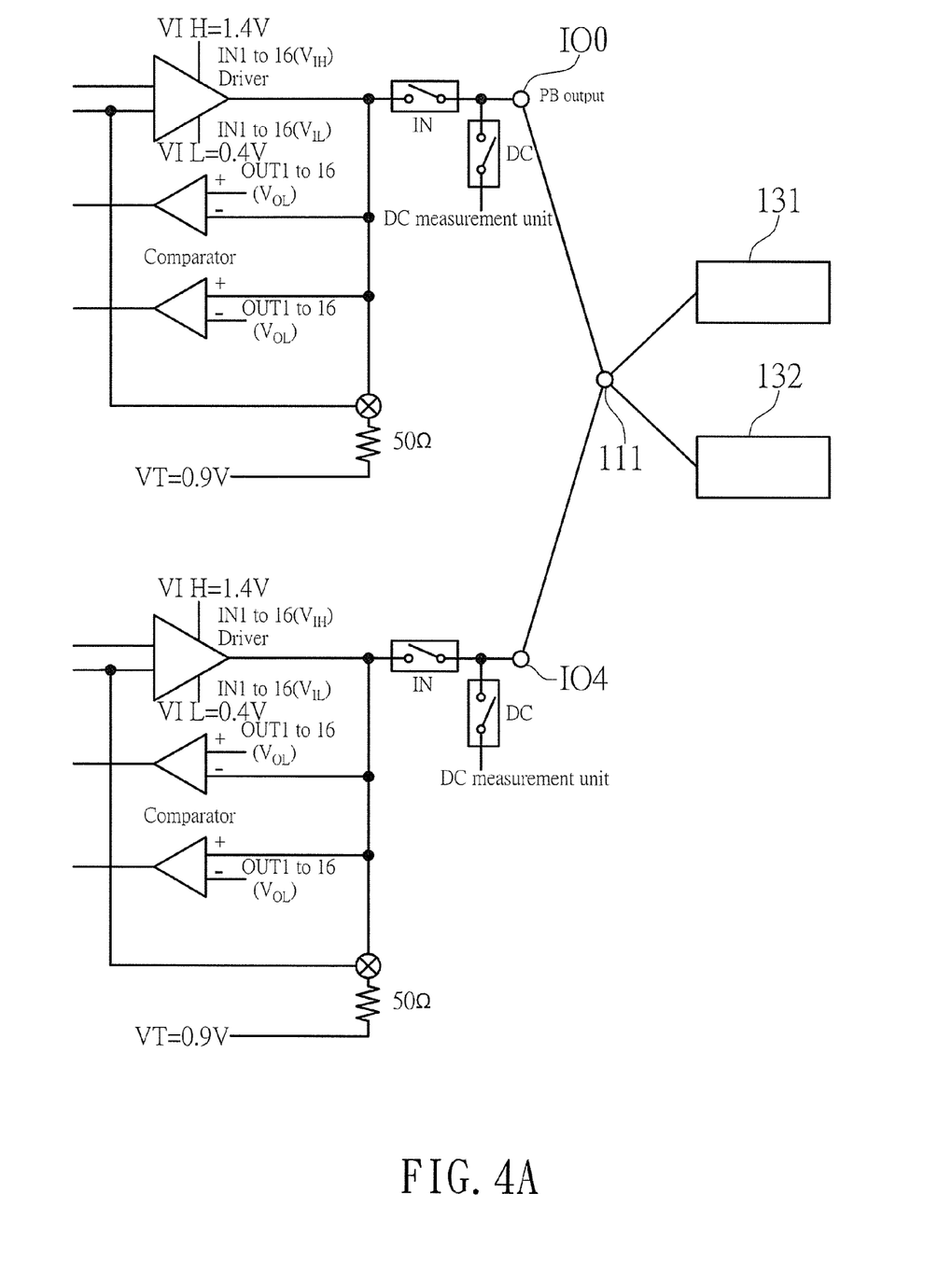
FIG. 4A is a partial circuit diagram of a testing device according to an embodiment of the present invention.
Figure 4B:
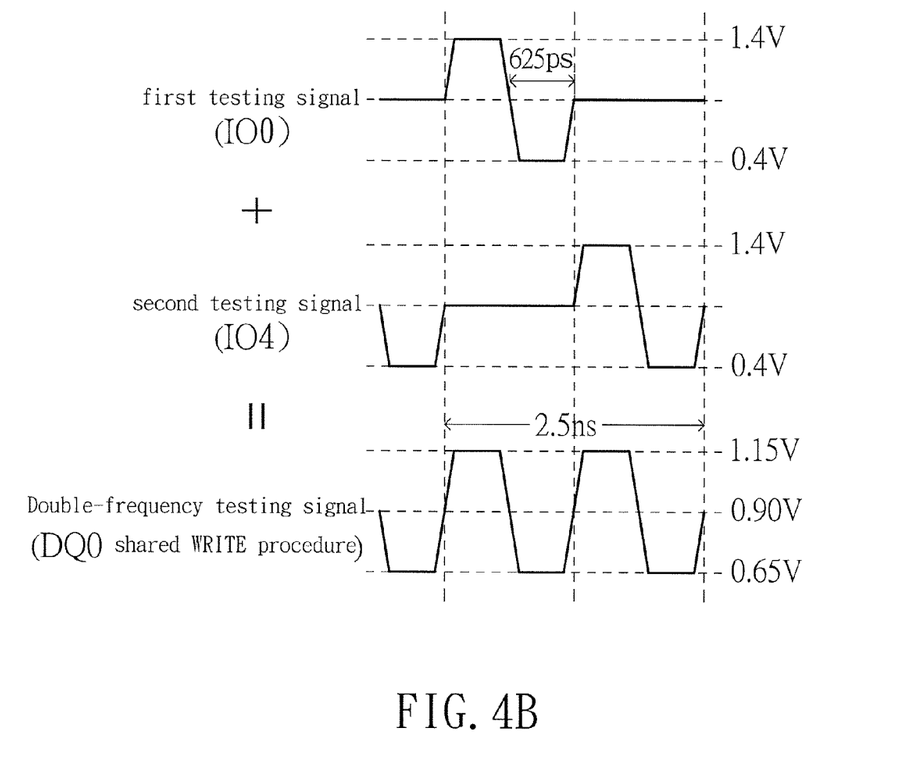
FIG. 4B is a timing diagram of a first testing signal, a second signal and a double-frequency testing signal during a WRITE procedure according to an embodiment of the present invention.
Figure 4C:
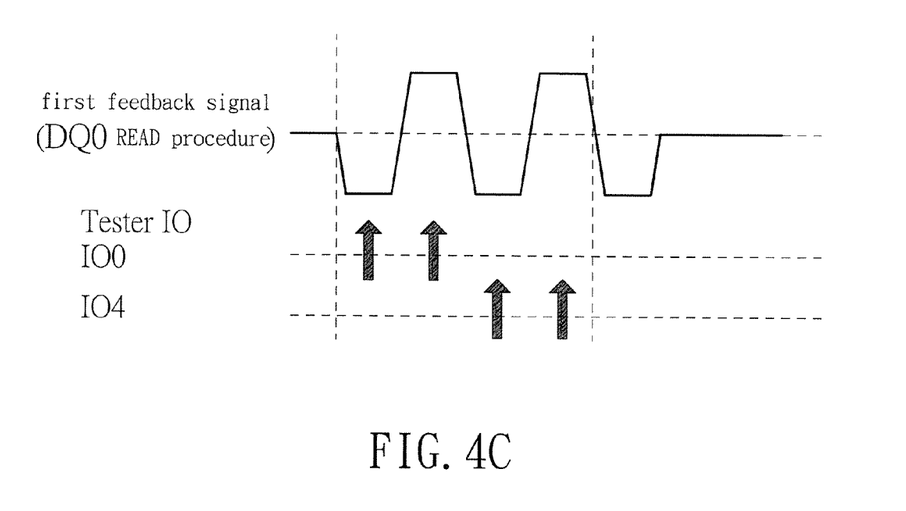
FIG. 4C is a timing diagram of identical feedback signals detected at different I/O terminal groups during a READ procedure according to an embodiment of the present invention.

Taking the pin DQ0 for example, FIG. 4A is a partial circuit diagram of the testing device 100 for high-frequency memory packages. Referring to FIG. 4B, a timing diagram of the first testing signals, the second testing signals, and the double-frequency testing signals during the WRITE procedure of a pair of pins DQ0 is illustrated. Herein, there may be a timing difference between the first testing signal and the second testing signal. Therefore, the first testing signal and the second testing signal are superimposed to generate the double-frequency signal. FIG. 4C illustrates a timing diagram of the identical feedback signals read from the pins DQ0 detected at different I/O terminal groups during the READ procedure. Herein, the detected timing is illustrated as the arrows pointing upward in FIG. 4C. In an example of simultaneously detecting at different I/O terminals IO0 and IO4 from different I/O terminal groups 121 and 122, the feedback signals may be transmitted by one single pin or by multiple pins. In the embodiment of single pin transmission, when a high frequency feedback signal is transmitted from the pin DQ0 of the first socket 131, the pin DQ0 of the second socket 132 is disabled. When another high frequency feedback signal is transmitted from the pin DQ0 of the second socket 132, the pin DQ0 of the first socket 131 is disabled. Accordingly, after being transmitted from the one single pin DQ0, the high frequency feedback signal may still be duplicated and transmitted to different I/O terminals IO0 and IO4. A forepart data and a final part data of the high frequency feedback signal may be read respectively as shown in FIG. 4C. Alternatively, in an embodiment of common pins transmission, the high frequency feedback signals are simultaneously transmitted from the pin DQ0 of the first socket 131 and the pin DQ0 of the second socket 132 to the corresponding I/O terminals IO0 and IO4 at different I/O terminal groups 121, 122. Accordingly, whether the output data from the same pin function arrangement at different sockets is normal or not can be determined by waveform correlation.

Referring to FIG. 3, FIG. 4A to FIG. 4C, a testing method for high frequency memory packages utilizing the testing device 100 is described as follows.

A loading step may be executed. The loading step may include disposing at least two memory packages to the first socket 131 and the second socket 132 of the socket group 130. Each of the memory packages may correspond to one of the sockets and each of the memory packages includes one or more chips (the first chip 200A and/or the second chip 200B) assembled therein. The first chip 200A of one of the memory packages arranged in the first socket 131 is electrically connected to the first pin group 133. The chip 200B of another memory package arranged in the second socket 132 may be electrically connected to the second pin group 134. As shown in FIG. 3 and FIG. 4B, a WRITE procedure may be performed. A first testing signal may be transmitted from the first I/O terminal group 121, e.g. I/O terminal IO0, of the tester 120 to the signal processing module 111, and a second testing signal is transmitted from the second I/O terminal group 122, e.g. I/O terminal IO4, to the same signal processing module 111. The transfer interface 110 merges the first testing signal and the second testing signal to generate a double-frequency testing signal (e.g. merging the signals form the I/O terminals IO0 and the I/O terminal IO4). The double-frequency testing signal is then transmitted from the signal processing module 111 to the first chip 200A (e.g. transmitted to the pin DQ0 of the first socket 131) through the third bus 114 and to the first pin group 133 of the first socket 131. The double-frequency testing signal may also be simultaneously transmitted from the signal processing module 111 to the chip 200B (e.g. transmitted to the pin DQ0 of the second socket 132) through the fourth bus 115 and to the second pin group 134 of the second socket 132. Thereby, the two chips (the first chip 200A and the second chips 200B) of the memory packages arranged in the first socket 131 and/or the second socket 132 can simultaneously perform high frequency WRITE procedure using the double-frequency testing signal and maintain the number of parallel testing pins of the tester 120.

Then, referring to FIG. 3 and FIG. 4C, a READ procedure is executed. A first feedback signal transmitted by the first chip 200A of the memory package arranged in the first socket 131 is transmitted to the signal processing module 111 through the pins DQ0 to DQ3 (e.g. the pin DQ0 of the first socket 131) of the first pin group 133 and the third bus 114. The transfer interface 110 duplicates and shares the first feedback signal to generate a plurality of identical first feedback signals. One of the identical first feedback signals is transmitted to the I/O terminals IO0 to IO3 (e.g. the I/O terminal IO0 as shown in FIG. 4C) of the first I/O terminal group 121 through the signal processing module 111 and the first bus 112, and another one of the identical first feedback signals is transmitted to the I/O terminals IO4 to IO7 (e.g. the I/O terminal IO4 as shown in FIG. 4C) of the second I/O terminal group 122 through the signal processing module 111 and the second bus 113. The tester 120 receives the plurality of the identical first feedback signals from different I/O terminal group 121 and 122 and correlates the identical first feedback signals with the first testing signals and the second testing signals to complete the READ procedure of testing the first chip 200A of the memory package arranged in the first socket 131. During the READ procedure to the first socket, either in synchronous or asynchronous, a second feedback signal transmitted by the second chip 200B of the memory package arranged in the second socket 132 is transmitted to the signal processing module 111 through the pins DQ0 to DQ3 (e.g. the pin DQ0 in the second socket 132) of the second pin group 134 and the fourth bus 115. The transfer interface 110 duplicates the second feedback signal to generate a plurality of identical second feedback signals, wherein one of the identical second feedback signals is transmitted to the I/O terminals IO0 to IO3 of the first I/O terminal group 121 through the signal processing module 111 and the first bus 112, and another one of the identical second feedback signals is transmitted to the I/O terminals IO4 to IO7 of the second I/O terminal group 122 through the signal processing module 111 and the second bus 113. The tester 120 may receive the plurality of the identical second feedback signals from different I/O terminal group 121 and 122, and correlates the identical second feedback signals with the first testing signal and the second testing signal to complete the READ procedure of testing the second chip 200B of the memory package arranged in the second socket 132.

Figure 5:
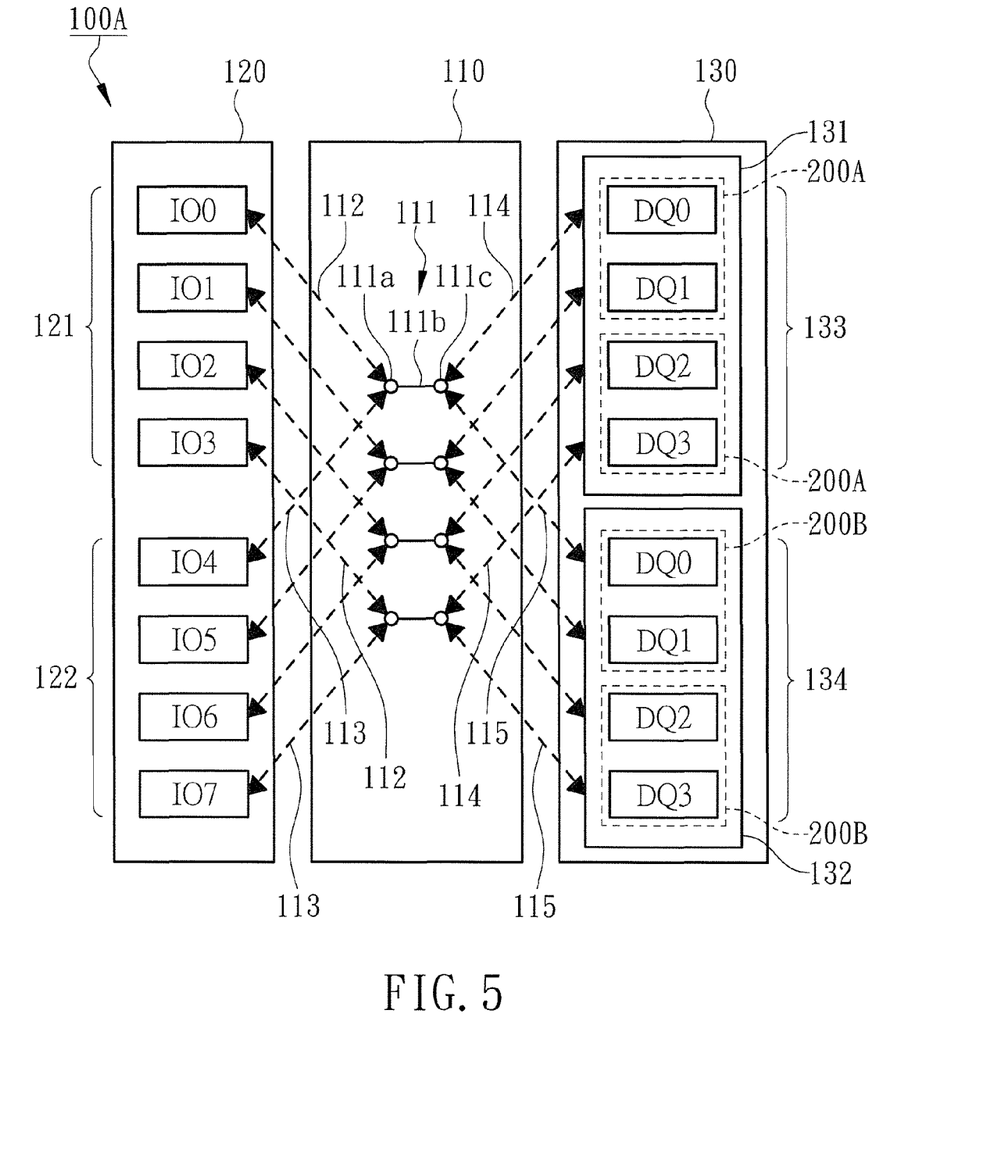
FIG. 5 is a block diagram of a testing device for high-frequency memory packages according to another embodiment of the present invention.

Referring to FIG. 5, a block diagram of a testing device 100A for high-frequency memory packages according to another embodiment of the present invention is illustrated. The difference between the embodiment in FIG. 3 and the embodiment in FIG. 5 is the signal processing module 111 in FIG. 3 is a multiple-input multiple-output (MIMO) nodes, wherein each of the MIMO node may include a via structure. Each of the signal processing modules 111 in FIG. 5 includes a merging node 111a, a double-frequency circuit 111b and a sharing node 111c. The merging nodes 111a, the double-frequency circuits 111b and the sharing nodes 111c are corresponds to one another. The double-frequency circuits 111b signally connect the corresponding merging nodes 111a and the corresponding sharing nodes 111c. Herein, the signal transmitting frequency of the double-frequency circuits 111b is double or multiple times of the testing frequency provided by the tester 120.

The first bus 112 signally connects the I/O terminals IO0 to IO3 of the first I/O terminal group 121 and the corresponding merging nodes 111a. The second bus 113 signally connects the I/O terminals IO4 to IO7 of the second I/O terminal group 122 to the corresponding merging nodes 111a. Similarly, the third bus 114 signally connects the corresponding sharing nodes 111c to the pins DQ0 to DQ3 of the first pin group 133, and the fourth bus 115 signally connects the corresponding sharing nodes 111c to the pins DQ0 to DQ3 of the second pin group 134. Thereby, the first testing signals transmitted from the I/O terminal IO0 to IO3 of the first I/O terminal group 121 and the second testing signals transmitted from the I/O terminal IO4 to IO7 of the second I/O terminal group 122 are respectively transmitted to the corresponding merging nodes 111a of the signal processing module 111 through the first bus 112 and the second bus 113. The transfer interface 110 may then generate the double-frequency testing signals accordingly. The generated double-frequency testing signals are then shared (duplicated) and transmitted to the first pins DQ0 to DQ3 of the first pin group 133 and the second pins DQ0 to DQ3 of the second pin group 134 through the corresponding double-frequency circuits 111b and the corresponding sharing nodes 111c to simultaneously perform the WRITE procedure for testing a plurality of chips (including the first chip 200A and the second chip 200B) of the memory packages.

After the sharing and WRITE procedure is performed on the chips of the memory packages, a plurality of READ procedures are performed to produce a plurality of feedback signals. During a first READ procedure, the first chip 200A of the memory package arranged in the first socket 131 transmits a first feedback signal to the signal processing module 111 through the first pin group 133. The transfer interface 110 duplicates the first feedback signal to generate a plurality of identical first feedback signals. One of the identical first feedback signals is transmitted to the first I/O terminal group 121 through the signal processing module 111 and the first bus 112, and another one of the identical first feedback signals is transmitted to the second I/O terminal group 122 through the signal processing module 111 and the second bus 113. Accordingly, the tester 120 may receive the identical first feedback signals at different I/O terminal groups 121 and 122, and then correlate the identical first feedback signals with the first testing signal and the second testing signal to complete the first READ procedure for testing the first chip 200A of the memory package arranged in the first socket 131. For example, the first I/O terminal group 121 may test two data identical with the forepart of the first feedback signals, and the second I/O terminal group 122 may test two data identical with the final part of the first feedback signals. During a second READ procedure, the second chip 200B of the memory packages arranged in the second socket 132 transmits a plurality of second feedback signals to the sharing node 111c of the signal processing module 111 through the second pin group 134. The transfer interface 110 duplicates the second feedback signals to generate a plurality of identical second feedback signals. A part of the identical second feedback signals are transmitted to the first I/O terminal group 121 through the signal processing module 111 and the first bus 112, and another part of the identical second feedback signals are transmitted to the second I/O ten final group 122 through the signal processing module 111 and the second bus 113. Thereby, the tester 120 may receive the plurality of identical second feedback signals at different I/O terminal groups 121 and 122, and then correlate the identical second feedback signals with the first testing signal and the second testing signal to complete the second READ procedure for testing the second chip 200B of the memory package arranged in the second socket 132.

Figure 6:
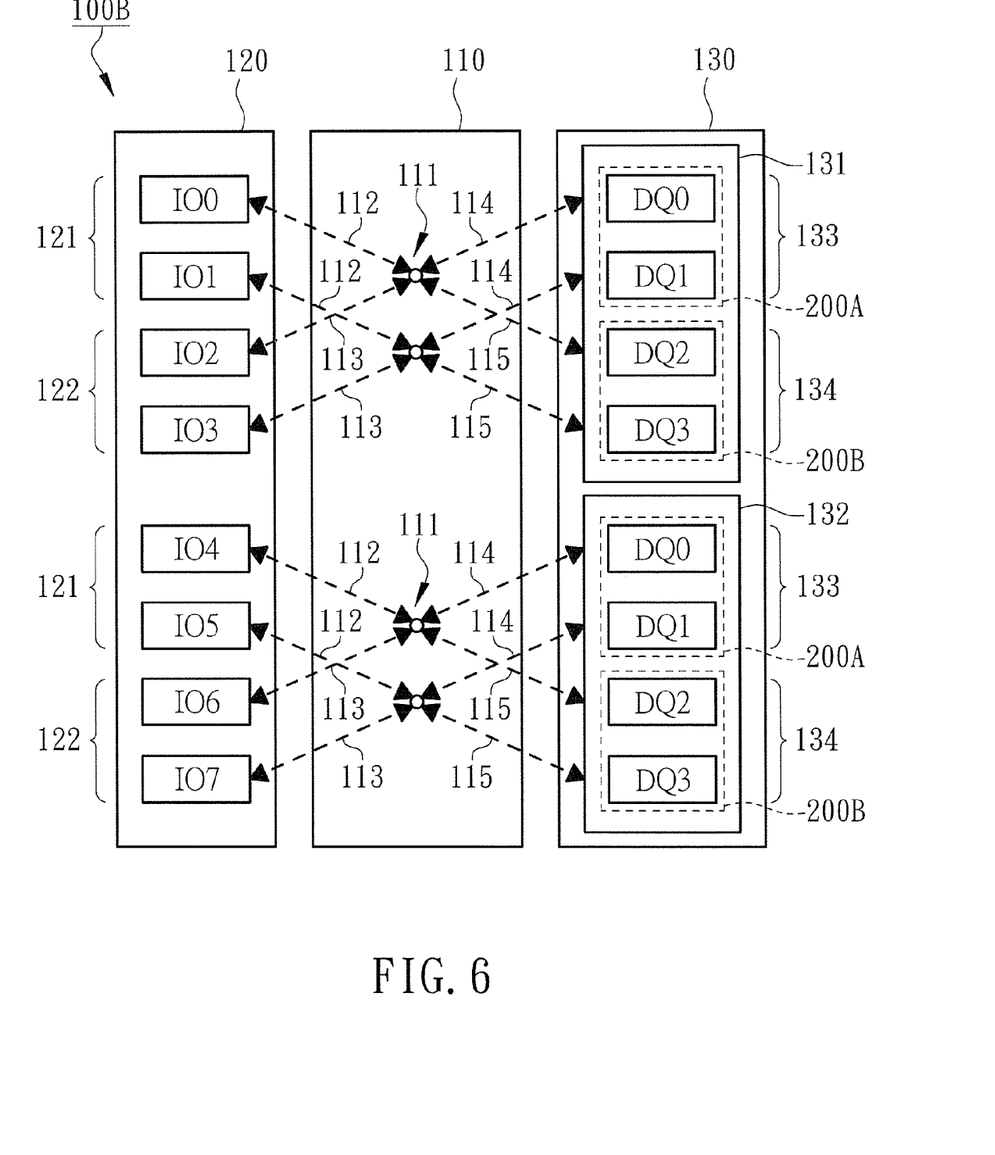
FIG. 6 is a block diagram of a testing device for high-frequency memory packages according to yet another embodiment of the present invention.

Referring to FIG. 6, a block diagram of a testing device 100B for high-frequency memory packages according to yet another embodiment of the present invention is illustrated. The difference between the embodiment presented in FIG. 6 and the embodiment in FIG. 3 is in the definition of I/O terminals. The first I/O terminal group 121 includes I/O terminals IO0, IO1, IO4, IO5, and the second I/O terminal group 122 includes I/O terminals IO2, IO3, IO6, IO7. The first pin group 133 includes pins DQ0 and DQ1 and the second pin group 134 includes pins DQ2 and DQ3. The socket group 130 includes a first socket 131 and a second socket 132, wherein each of the first socket 131 and the second socket 132 includes the first pin group 133 and the second pin group 134, which may correspond to different chips (the first chip 200A and the second chip 200B) assembled in the same memory package. The first pin group 133 and the second pin group 134 may be signally connected to different chips in the same socket of the socket group 130. Therefore, the pin group 133 and the pin group 134 are defined by the connection of the chip. Even in the same socket, when two pins are configured to be connected to different chips, the two pins are not categorized into the same pin group. Parts of the first pin group 133 and parts of the second pin group 134 are arranged in the same socket of the socket group 130. For example, a plurality of pins (e.g. DQ0 and DQ1) of the first pin group 133 and a plurality of pins (e.g. DQ2 and DQ3) of the second pin group 134 have parts arranged in both the first socket 131 and the second socket 132. Moreover, the pin groups 133 and 134 may be sequentially connected to different bus with different pin function arrangement to provide corresponding connection for the third bus 114 and the fourth bus 115. Namely, the part of the first pin group and the part of the second pin group arranged in the same socket have different pin function arrangement, so as to signally connect the corresponding third bus and fourth bus.

In the present embodiment, the difference between the first chip 200A and the second chip 200B is that the first chip 200A and the second chip 200B are signally connected to different pins in the corresponding socket during testing. Namely, the first chip 200A and the second chip 200B may be assembled in a designated memory package but be signally connected to different pins in the corresponding socket.

In the present embodiment, the first I/O terminal group 121 is coupled to the signal processing module 111 through the first bus 112, and the second I/O terminal group 122 is coupled to the signal processing module 111 through the second bus 113. The pins DQ0 and DQ1 of the first pin group 133 are coupled to the signal processing module 111 through the third bus 114, and the pins DQ2 and DQ3 of the second pin group 134 are coupled to the signal processing module 111 through the fourth bus 115. The I/O terminals IO0, IO1, IO4, IO5 of the first I/O terminal group 121 are configured to respectively transmit a plurality of first testing signals, and the I/O terminals IO2, IO3, IO6, IO7 of the second I/O terminal group 122 are configured to respectively transmit a plurality of second testing signals. The transfer interface 110 receives the first testing signals and the second testing signals, and the signal processing module 111 merges the first testing signals and the second testing signals to generate a plurality of double-frequency testing signals. The double-frequency testing signals are transmitted to the pins DQ0 and DQ1 of the first pin group 133 through the signal processing module 111 and the third bus 114 to write data into the first chip 200A. The double-frequency testing signals may be simultaneously transmitted to the pins DQ2 and DQ3 of the second pin group 134 through the signal processing module 111 and the fourth bus 115 to write data into the second chip 200B to complete the WRITE procedure for testing the high frequency memory package. After the WRITE procedure for testing, a plurality of feedback signals are transmitted by the chips of the memory package. A plurality of first feedback signals transmitted by the first chip 200A is transmitted to the signal processing module 111 through the pins DQ0 and DQ1 of the first pin group 133 and the third bus 114. The transfer interface 110 duplicates (shares) the first feedback signals to generate a plurality identical first feedback signals. Then, a part of the identical first feedback signals are transmitted to the I/O terminals IO0, IO1 or IO4, IO5 of the first I/O terminal group 121 through the signal processing module 111 and the first bus 112, and another part of the identical first feedback signals are transmitted to the I/O terminals IO2, IO3 or IO6, IO7 of the second I/O terminal group 122 through the signal processing module 111 and the second bus 113. Thereby, the tester 120 receives these identical first feedback signals from different I/O terminal groups 121 and 122, and correlates the identical first feedback signals with the first testing signal and the second testing signal to complete the READ procedure for testing the first chip 200A of the memory package.

In addition, a plurality of second feedback signals transmitted by the second chip 200B are transmitted to the signal processing module 111 through the pins DQ2 and DQ3 of the second pin group 134 and the fourth bus 115. The transfer interface 110 duplicates (shares) the second feedback signals to generate a plurality identical second feedback signals. Then, a part of second the identical second feedback signals is transmitted to the I/O terminals IO0, IO1, or IO4, IO5 of the first I/O terminal group 121 through the signal processing module 111 and the first bus 112, and another part of the identical second feedback signals are transmitted to the I/O terminals IO2, IO3 or IO6, IO7 of the second I/O terminal group 122 through the signal processing module 111 and the second bus 113. Then, the identical second feedback signals are correlated with the first testing signal and the second testing signal to complete the READ procedure for testing the second chip 200B of the memory package.

In the present invention, the testing signals are merged by the signal processing module of the transfer interface to generate the double-frequency testing signals. Then, the generated double-frequency testing signals and the corresponding feedback signal are duplicated and shared for high-frequency writing and reading. Therefore, the tester is capable of simultaneously perform testing on multiple memory packages. Also, when the tester with lower frequency performs high frequency memory testing, the valid testing number of the memory packages meets the maximum testing capability of the tester 120, so as to achieve high efficiency for high-frequency memory testing. Moreover, when the yield of the memory packages increases, the advantage of high efficiency in testing high-frequency memory packages by the testing device and the testing method of the present invention is more eminent.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A testing device, comprising:
    a transfer interface having a signal processing module, a first bus, a second bus, a third bus and a fourth bus, wherein the first bus, the second bus, the third bus and the fourth bus are connected to the signal processing module;
    a tester having a first I/O terminal group and a second I/O terminal group, wherein the first I/O terminal group is coupled to the signal processing module through the first bus, and the second I/O terminal group is coupled to the signal processing module through the second bus; and
    a socket group having a first pin group and a second pin group, wherein the first pin group is coupled to the signal processing module through the third bus, the second pin group is coupled to the signal processing module through the fourth bus, the first I/O terminal group is configured to transmit a first testing signal to the signal processing module through the first bus, the second I/O terminal group is configured to transmit a second testing signal to the signal processing module through the second bus, the transfer interface is configured to merge the first testing signal and the second testing signal to generate a double-frequency testing signal, the double-frequency testing signal is transmitted to the first pin group through the signal processing module and the third bus, and the double-frequency testing signal is also transmitted to the second pin group through the signal processing module and the fourth bus.

2. The testing device as claimed claim 1, wherein the signal processing module comprises a plurality of multiple-input multiple-output (MIMO) nodes.

3. The testing device as claimed claim 1, wherein the signal processing module comprises a plurality of merging nodes, a plurality of double-frequency circuits and a plurality of sharing nodes, wherein numbers of the merging nodes, the double-frequency circuit and the sharing nodes are corresponding to each other, the double-frequency circuits connect the corresponding merging nodes and the corresponding sharing nodes, the first bus and the second bus connect the corresponding merging nodes, and the third bus and the fourth bus connect the corresponding sharing nodes.

4. The testing device as claimed claim 1, wherein the double-frequency testing signal is twice a frequency of the first testing signal or twice a frequency of the second testing signal.

5. The testing device as claimed claim 1, wherein a frequency of the first testing signal and a frequency of the second testing signal are substantially the same.

6. The testing device as claimed claim 1, wherein the first pin group and the second pin group are respectively arranged in a first socket and a second socket of the socket group, wherein the first pin group and the second pin group have the same pin function arrangement to be correspondingly connected to the third bus and the fourth bus.

7. The testing device as claimed claim 1, wherein a part of the first pin group and a part of the second pin group are arranged in one socket of the socket group, and the part of the first pin group and the part of the second pin group have different pin function arrangement to be correspondingly connected to the third bus and the fourth bus.

8. The testing device as claimed claim 1, wherein a transmission path of the first bus and a transmission path of the second bus are substantially the same.

9. The testing device as claimed claim 8, wherein a transmission path of the third bus and a transmission path of the fourth bus are substantially the same.

10. A testing method, comprising:
    providing a testing device, wherein the testing device comprises:
        a transfer interface having a signal processing module, a first bus, a second bus, a third bus and a fourth bus, wherein the first bus, the second bus, the third bus and the fourth bus are connected to the signal processing module;
        a tester having a first I/O terminal group and a second I/O terminal group, wherein the first I/O terminal group is coupled to the signal processing module through the first bus, and the second I/O terminal group is coupled to the signal processing module through the second bus; and
        a socket group having a first pin group and a second pin group, wherein the first pin group is coupled to the signal processing module through the third bus, the second pin group is coupled to the signal processing module through the fourth bus;

disposing at least two memory packages to be tested on the socket group, wherein a first chip of the memory packages is electrically connected to the first pin group, a second chip of the memory packages is electrically connected to the second pin group, the first chip and the second chip are located in either different sockets or in same socket of the socket group; and performing a WRITE procedure, wherein a first testing signal is transmitted to the signal processing module from the first I/O terminal group of the tester, a second testing signal is transmitted to the signal processing module from the second I/O terminal group, the transfer interface merges the first testing signal and the second testing signal to generate a double-frequency testing signal, the double-frequency testing signal is transmitted to the first chip through the signal processing module, the third bus and the first pin group, and the doubt-frequency testing signal is also transmitted to the second chip through the signal processing module, the fourth bus and the second pin group.

11. The testing method as claimed claim 10, wherein the signal processing module comprises a plurality of multiple-input multiple-output (MIMO) nodes.

12. The testing method as claimed claim 10, further comprising performing a READ procedure, wherein the first chip transmits a first feedback signal through the first pin group, the third bus transmits the first feedback signal to the signal processing module, the transfer interface duplicates the first feedback signal to generate a plurality of identical first feedback signals, one of the identical first feedback signals is transmitted to the first I/O terminal group through the signal processing module and the first bus, and another one of the identical first feedback signals is transmitted to the second I/O terminal group through the signal processing module and the second bus, the second chip transmits a second feedback signal through the second pin group, the fourth bus transmits the second feedback signal to the signal processing module, the transfer interface duplicates the second feedback signal to generate a plurality of identical second feedback signals, a part of the identical second feedback signals is transmitted to the first I/O terminal group through the signal processing module and the first bus, and another part of the identical second feedback signals is transmitted to the second I/O terminal group through the signal processing module and the second bus, such that the tester receives the identical first feedback signals and the identical second feedback signals from the first I/O terminal group and the second I/O terminal groups.

13. The testing method as claimed claim 12, wherein the READ procedure further comprises the tester correlates the identical first feedback signals and the identical second feedback signals with the first testing signal and the second testing signal.

14. The testing method as claimed claim 10, wherein the signal processing module comprises a plurality of merging nodes, a plurality of double-frequency circuits and a plurality of sharing nodes, wherein numbers of the merging nodes, the double-frequency circuit and the sharing nodes are corresponding to each other, the double-frequency circuits connect the corresponding merging nodes and the corresponding sharing nodes, the first bus and the second bus connect the corresponding merging nodes, and the third bus and the fourth bus connect the corresponding sharing nodes.

15. The testing method as claimed claim 10, wherein the double-frequency testing signal is twice a frequency of the first testing signal or twice a frequency of the second testing signal.

16. The testing method as claimed claim 10, wherein a frequency of the first testing signal and a frequency of the second testing signal are substantially the same.

17. The testing method as claimed claim 10, wherein when the first chip and the second chip are located in a first socket and a second socket of the socket group, the first pin group and the second pin group are respectively arranged in the first socket and the second socket of the socket group, and the first pin group and the second pin group have the same pin function arrangement to be correspondingly connected to the third bus and the fourth bus.

18. The testing method as claimed claim 10, wherein when the first chip and the second chip are located in the same socket of the socket group, a part of the first pin group and a part of the second pin group are arranged in the same socket of the socket group, and the part of the first pin group and the part of the second pin group have different pin function arrangement to be correspondingly connected to the third bus and the fourth bus.

19. The testing method as claimed claim 10, wherein a transmission path of the first bus and a transmission path of the second bus are substantially the same.

20. The testing method as claimed claim 19, wherein a transmission path of the third bus and a transmission path of the fourth bus are substantially the same.

* * * * *